United States Patent [19]

Dyer

[11] Patent Number: 4,470,894
[45] Date of Patent: Sep. 11, 1984

[54] NICKEL ELECTRODES FOR WATER ELECTROLYZERS

[75] Inventor: Christopher K. Dyer, Summit, N.J.

[73] Assignee: AT&T Bell Laboratories, Murray Hill, N.J.

[21] Appl. No.: 519,515

[22] Filed: Aug. 1, 1983

[51] Int. Cl.³ .................... C25B 1/00; C25B 11/04
[52] U.S. Cl. .................................. 204/129; 204/140; 204/290 R
[58] Field of Search ............... 204/290 R, 290 F, 140, 204/129

[56] References Cited

U.S. PATENT DOCUMENTS 3,574,074  4/1971  Khera .............................. 204/290 F
4,225,346  9/1980  Helliker et al. ....................... 75/211
4,384,928  5/1983  Hall .................................. 204/290 R

OTHER PUBLICATIONS

"Ni(OH)₂-Impregnated Anodes for Alkaline Water Electrolysis", D. E. Hall, *Journal of the Electrochemical Society*, 130 (1983).

*Primary Examiner*—John F. Niebling
*Attorney, Agent, or Firm*—Walter G. Nilsen

[57] ABSTRACT

Disclosed is a water electrolysis process for producing hydrogen in which a nickel anode is prepared by an electrolytic corrosion procedure. This procedure reduces the anode overpotential by about 0.2 volts at commercially used current densities which leads to greater process efficiency and significant reduction in electrical energy consumption.

17 Claims, 4 Drawing Figures

NICKEL ELECTRODES FOR WATER ELECTROLYZERS

TECHNICAL FIELD

The invention is a process involving the electrolysis of water.

BACKGROUND OF THE INVENTION

Electrolytic processes involving water are of considerable importance commercially. Such processes involve the electrodeposition of metals, electrochemical synthesis procedures, electrochemical loading of electrodes for batteries, etc. A particularly important industrial process involving the electrolysis of water is the production of hydrogen gas. Hydrogen gas is an excellent source of energy and has many other uses in chemical technology and industry.

It is highly desirable to reduce the cost of processes involving the oxidation of water including hydrogen production. Most of this cost is involved with the consumption of electrical energy. Reduction of cell voltage at a given current density reduces the amount of electrical energy needed to produce a given amount of hydrogen gas.

Much of the cell voltage in water electrolysis originates in the overpotential at the electrodes, especially the anode. Nickel and its alloys are the preferred materials for electrodes, especially anodes in the electrolysis of water in alkaline solutions due to their high corrosion resistance at anodic potentials in aqueous alkaline solutions and their low cost. Many of the characteristics of nickel anodes in the electrolysis of water are described in a publication entitled, "Ni(OH)$_2$-Impregnated Anodes for Alkaline Water Electrolysis" by D. E. Hall; *Journal of the Electrochemical Society*, 130, 317 (1983). Of particular interest is the disclosure that nickel hydroxide produced by electrochemical precipitation methods on the nickel anode reduces the oxygen evolution overvoltage. However, even lower overvoltages for either or both electrodes are highly desirable particularly for efficient and low-cost production of hydrogen. Much information on the production of hydrogen by water electrolysis is contained in a book entitled, *Hydrogen: Its Technology and Implications*-Volume 1: *Production Technology*, K. E. Cox and K. D. Williamson, Jr. editors, CRC Press, Inc., Boca Raton, Fla.

SUMMARY OF THE INVENTION

The invention is a process involving the oxidation of water in which the anode is prepared in a special way. The anode structure contains nickel and is treated by an electrochemical process in which the anode structure is subjected to alternating anodic and cathodic pulses. The same procedure reduces the overvoltage at the cathode but the reduction is usually not as great. The electrolytic process for preparing the electrode involves impressing an alternating potential on the nickel electrode structure such that nickel metal dissolves on the oxidizing part of the cycle and nickel ions precipitate on the reducing part of the cycle. It is believed that the nickel ions precipitate on the reducing part of the cycle because of the increase in pH inside the nickel structure. The electrolytic solution should be sufficiently conductive to allow reasonable rates for the conversion process (conductivity greater than 0.001 mho-cm) and contain a substance (usually an anion) that enhances the dissolution of nickel during the anodic or oxidizing part of the cycle. It is believed that the dissolution effect is due to dissolution or breakdown of the protective or passivating film (believed to be an oxide film) on the nickel surface. Typical substances to meet this requirement are halide ions (particularly chloride and bromide ions) which are usually introduced in the form of alkali-metal halides such as DCl or KBr salts. Although the process is not highly sensitive to pH, generally pH values close to neutral (i.e., pH 3 to 10) are preferred with 6-8 most preferred. These pH ranges are preferred because of the high rates for producing active material (nickel ions believed to be in the form of nickel hydroxide) and the ease of handling solutions close to neutral pH. Indeed, a particular advantage of the procedure is that it does not involve use of corrosive or dangerous materials. Nickel anodes made in accordance with the above process have significantly lower overpotentials than conventional anodes for the oxidation of water in a water electrolysis process. Also, nickel cathodes made by the same process also have lower overpotentials although the reduction is not usually as great as with the anode. Such reduced overpotentials make possible the production of hydrogen by the electrolysis of water with considerably reduced consumption of electrical power.

DETAILED DESCRIPTION

In broad terms, the invention is a process for oxidizing water at an anode which has been made by a special electrolytic process. Such anodes have significantly lower over voltages which have a number of significant advantages. It significantly reduces the electrical energy consumption and significantly reduces costs associated with such processes. Often, undesirable side reactions are reduced. A similar procedure for making the cathode also leads to lower overvoltages, but the reduction is usually not as great. The cathode is involved in the reduction of water to form hydrogen.

Although a large variety of electrolytic processes involve the oxidation of water, overvoltage reduction is most significant economically in water electrolysis. It is first convenient to describe a typical water electrolysis process and a typical apparatus for carrying out such a process. The electrolysis of water invovles the oxidation of water at an anode to form oxygen gas and the reduction of water at the cathode to form hydrogen gas. Commercially, the process is principally used to produce pure hydrogen (free of hydrocarbons obtained when hydrogen is produced by catalytic cracking of petroleum products).

The efficiency of the water electrolysis process depends on a number of factors including the voltage necessary to pass a given amount of current through the electrolysis apparatus, the conductivity of the water, etc. For practical purposes, the water should have a conductivity of at least 1 mho-cm but most electrolysis processes have conductivities much greater than 1 mho-cm, say 10 or 100 or higher mho-cm.

Generally, the electrolysis is carried out in highly conducting solutions with pH greater than 7. Such solutions may have a variety of compositions including high salt concentrations, salts plus base, etc. Generally, the highest conductivities are obtained using aqueous alkali-metal hydroxide solutions. Various concentrations are useful (e.g., 10 or 20 weight percent) but the highest conductivity is obtained with a concentration of about 30 weight percent (within about ±20 percent) potassium hydroxide in water.

Figure 1:
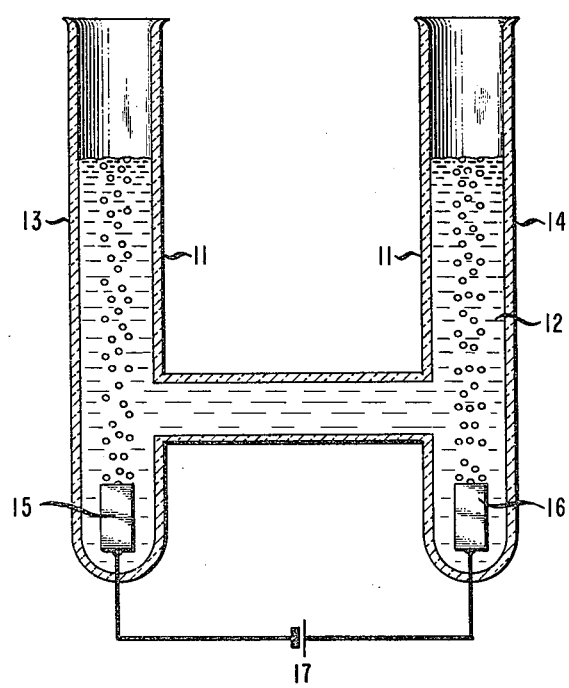
FIG. 1 shows a typical apparatus for the electrolysis of water.

FIG. 1 shows a rather simple apparatus 10 for electrolyzing water. The apparatus is made up of a container or vessel, 11, to hold the electrolyte, 12. Two arms, 13 and 14, are used to keep the oxygen and hydrogen gas separated. The one arm, 13, contains a cathode, 15, and produces hydrogen by electrochemical reduction of the water. The other arm, 14, contains the anode, 16, and produces oxygen by the electrochemical oxidation of water. A dc power supply 17, is used to supply electrical energy to the electrodes.

The unique aspect of the invention is the treatment given to the anode to produce a nickel anode of unusually low overvoltage. This treatment which is here called an activation treatment involves an electrolytic procedure for producing nickel ions in precipitated form. Benefits are also obtained for the cathode exposed to the same treatment.

A variety of structures may be used for a anode provided some nickel is present for conversion to nickel ions. Although sheets and screens may be used, porous structures are preferred because of the larger surface area obtained. Also, although nickel alloys are useful for anode construction, essentially pure nickel (e.g., 95 or 99 weight percent nickel) is preferred for convenience and easy availability. There are occasionally some benefits to be obtained from small amounts of cobalt in the nickel although this is probably better introduced through the electrolyte solution rather than nickel plaque material. Nickel plaques have been described in a number of references including C. D. Helliker et al, U.S. Pat. No. 4,225,346 issued Sept. 30, 1980.

The treatment procedure involves first anodically dissolving nickel from the nickel electrode structure by exposing the nickel structure to an anodic oxidizing pulse and then precipitating the dissolved nickel ions by exposing the nickel structure to a cathodic electrical pulse. This is done in an electrolytic solution containing sufficient ions to make the solution reasonably conductive (a conductivity of at least 0.001 mho-cm).

It is also preferred that the activation procedure be carried out in an electrolytic solution that contained ions that removed the protective coatings or layers on nickel metal (believed to be an oxide layer) so as to permit rapid dissolution of the nickel metal. The process can be carried out on any nickel structure useful for nickel electrodes.

The structure should contain significant amounts of nickel, say 30 or 50 or 90 percent nickel by weight. Also, it is preferred that the conducting nickel structure be porous (preferably porosities of from 60-90 percent porosity) so that a high surface area of nickel is exposed for conversion and preferably the porous nickel plaques should be nearly pure nickel (at least 99 percent by weight).

As stated above, the electrolytic solution should contain sufficient electrolyte for a conductivity of at least 0.001 mho-cm and a substance which promotes anodic dissolution of nickel. Various salts might be added to improve conductivity.

Preferred for the composition of the electrolytic solution is an aqueous solution containing a halide ion, preferably bromide or chloride with chloride most preferred. Although any convenient cation can be used in the electrolytic solution, generally an alkali-metal ion (potassium, sodium, etc.) is most convenient. More than one cation and/or anion may be used.

Concentrations of halide ion may vary over large limits consistent with the minimum conductivity of the solution set forth above and possible precipitation of the salt in the nickel plaque. A typical range is from 0.01 molar to saturation or just below saturation, with the range from 0.1 to 2 molar preferred. Most preferred, especially from KCl, is from 0.2 to 1.2 molar.

Generally, the process is not extremely sensitive to pH. Near neutral pH (say 6–8) is preferred mostly for convenience in carrying out the process. Inside the plaque, nickel that has been anodically dissolved during the anodic part of the cycle is precipitated during the cathodic part of the cycle due to an increase in the concentration of $OH^-$ ions.

Cobalt ions may also be introduced into the active material for various reasons. This may be done by dissolving cobalt salts into the electrolyte. Typical concentrations are 0.01 to 1.0 molar of a soluble cobalt salt. An important part of the activation process is repeated cycling of the electrode potentials so as to expose the nickel plaque alternately to anodic and cathodic potentials. For convenience, these varying potentials are often spoken of as anodic and cathodic pulses but the exact nature of the potential variation is not of particular importance as long as the nickel plaque is exposed to anodic and cathodic potentials. Indeed, the plaque need not be connected to a power supply. For example, putting the plaque in close proximity to one or more electrodes may be sufficient and in some cases may be preferred.

The frequency of the cycling may vary over large limits. Typical values are in the range from 0.01 to 100 Hz with 0.1 to 10 preferred and 0.2 to 2.0 most preferred. Total cycles may vary over large limits and depend on the type of conducting nickel structure used as well as other variables. Total cycles between 20 and 500 are preferred. Less than 20 cycles do not provide sufficient activation to obtain the full reduction in overpotential; more than 500 cycles, while not harmful, does not improve performance and is wasteful of time.

The anodic pulses are used to dissolve some of the nickel from the plaque and the cathodic pulse to precipitate the dissolved nickel as the active material. It is believed that the precipitate is in the form of nickel hydroxide.

The potentials of the various pulses may vary over wide limits provided the anodic potential is sufficient to dissolve the nickel and the cathodic pulse is sufficient to precipitate the dissolved nickel. Generally, an anodic potential more positive than 0.1 volts on the hydrogen scale (nhe) is used and a cathodic potential more negative than 0.0 volts (nhe) is used. More positive anodic potentials and more negative cathodic potentials may be used to increase rate, current, etc.

The activation process for electrodes is usually monitored by observing the current passing in each direction. The exact waveform of the potential is not generally of importance. A sinusoidal variation is often convenient but a square waveform is often more convenient for monitoring the activation process. Various other waveforms including asymmetric waveforms are also useful. The ratio of anodic to cathodic charge in a given cycle may vary between 10 and 0.1.

A number of experiments were carried out to ascertain the voltage reduction obtained through the activation procedure and the optimum amount of loading required for a given voltage reduction. The activation procedure is meant to produce a highly uniform layer of active nickel hydroxide within a porous nickel structure without blocking the pores so as to permit electrolytes to enter into the nickel pores. The electrode structure was made of sintered nickel having an average porosity of 77.5 percent with a mean pore size of 12.7 mm. This nickel structure was supported on a nickel wire mesh made with a 1 $cm^2$ projected area. The sintered nickel electrode structure was subjected to activation treatments of $\pm 125$ ma (peak to peak) altering current at a frequency of 0.25 Hz and using a squarre waveform. The electrode was a 1 molar aqueous solution of potassium chloride.

Different amounts of activation were used so as to ascertain the characteristics of the electrode as a function of activation. After the activation process, the electrodes were washed in distilled water. They were then subjected to a charge/discharge cycle at 250 ma/$cm^2$ in 30 percent potassium hydroxide in order to determine their coulombic capacity. This is a direct measure of the load level of active nickel hydroxide in the porous structure.

Figure 2:
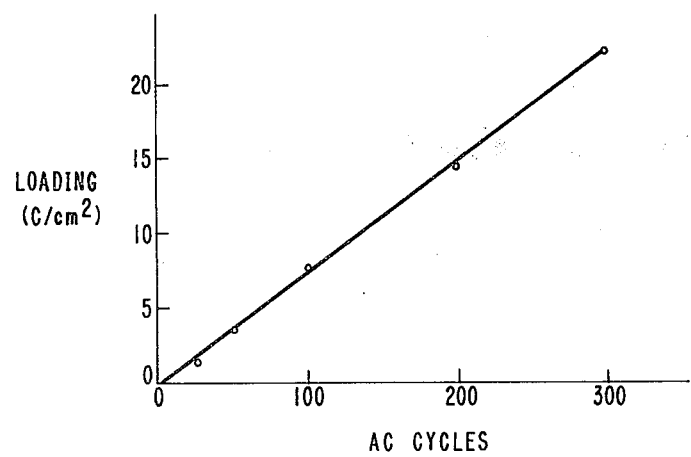
FIG. 2 shows a graph of amount of loading as a function of the number of cycles to which the nickel anode is exposed in the loading process.

The results of this part of the tests are shown in FIG. 2. Here, loading as measured by electrode capacity in units of coulombs/$cm^2$ of projected area is shown as a function of the number of cycles in the activation procedure. This graph can also be used to interpret the loadings in the graphs of FIG. 3 and 4. As can be seen from FIG. 2, the loading increases linearly with the number of cycles used in the activation procedure.

Each electrode was then recharged to oxygen evolution potentials in 30 percent potassium hydroxide at a given constant current in the range 25–250 ma/$cm^2$. The electrode potential was measured at the surface of the anode by means of a Luggin capillary probe containing a Hg/HgO reference electrode. The position of the probe tip on the electrode surface was changed and a new set of readings taken in order to average out potential measurement errors due to a different distances between probe tip and surface, nonuniformity in current flow, etc. The counterelectrodes on either side of the porous nickel electrode were made of platinum with area of approximately 50 $cm^2$. These electrodes generated the hydrogen in the nickel/hydrogen secondary cell. The cell was a closed beaker containing the aqueous potassium hydroxide. Experiments were carried out at room temperature (25 degrees C.) and 80 degrees C. (the temperature at which water hydrolysis is usually carried out commercially).

Figure 3:
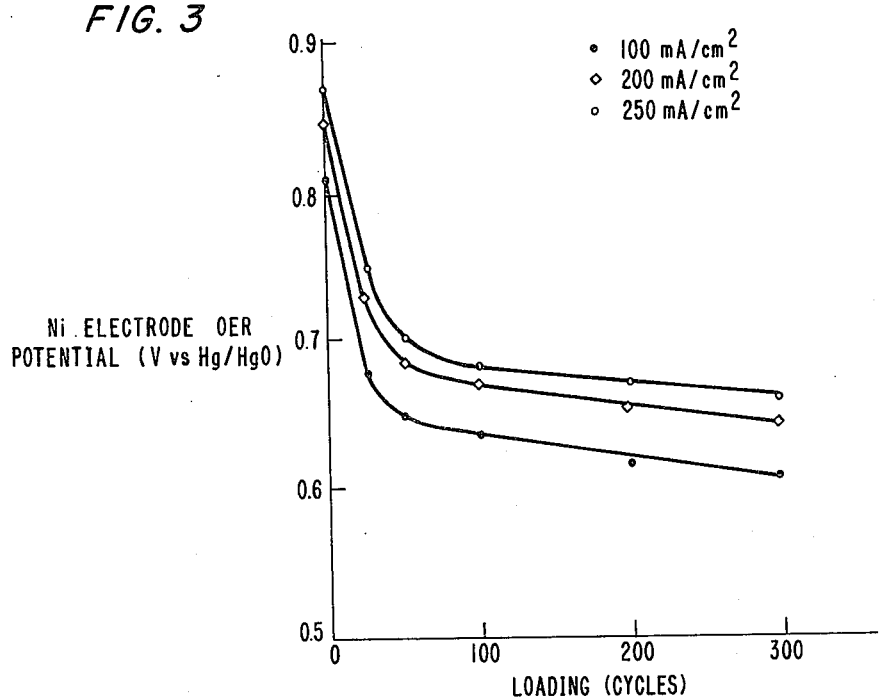
FIG. 3 shows a graph of anode potential (using Hg/HgO as a standard electrode) versus amount of loading for several current densities at room temperatures.
Figure 4:
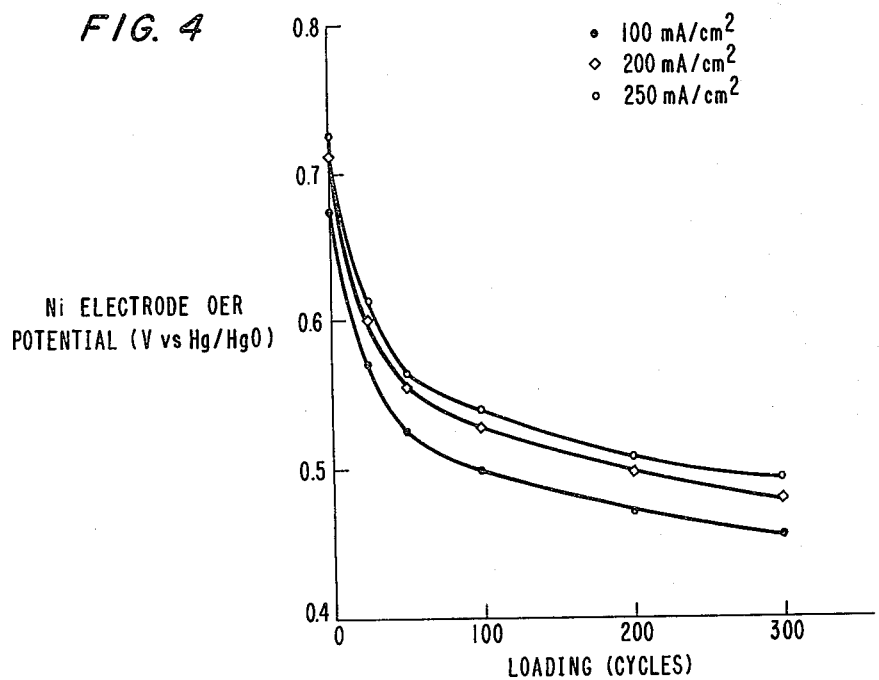
FIG. 4 shows the same type data at a temperature of 80 degrees C.

As can be seen from FIGS. 3 and 4, the activation procedure has a remarkable effect at reducing the overvoltage at a nickel anode for the oxidation of water to form oxygen. Most of the reduction takes place with only about 50 cycles of the activation procedure but additional cycles do have some effect. From FIG. 2, it can be seen that 50 cycles is equivalent to a loading of about 3.5–4.0 coulombs/$cm^2$.

Anodes prepared according to the activation procedure have reduced overvoltages (generally about 200 mv) with reduced power consumption for carrying out electrochemical processes involving the oxidation of water.

Some benefits are also obtained by preparing the cathode in the same way as the anode. Overvoltage reductions of about 50 mv are obtained. The mechanism for this reduction of overvoltage is not immediately apparent. It might involve modification of the nickel surface of the plaque rather than the presence of nickel compounds in the nickel plaque.

What is claimed is:

1. An electrochemical process comprising the step of passing current through anode, aqueous electrochemical solution and cathode in which water is oxidized at the anode to form oxygen, the anode is made from an anode structure by an electrolytic procedure and the anode structure comprises nickel characterized in that the electrolytic procedure comprises the step of exposing the anode structure to alternate anodic and cathodic potentials in an electrolytic solution, said electrolytic solution having conductivity greater than 0.001 mho-cm and said electrolytic solution comprising ions that enhance the dissolution of metallic nickel.

2. The process of claim 1 in which the electrolytic solution has a pH between 3 and 10.

3. The process of claim 1 in which the electrolytic solution comprises halide ion.

4. The process of claim 3 in which the halide ion is a chloride ion.

5. The process of claim 4 in which the concentration of chloride ion is between 0.01 molar and saturation.

6. The process of claim 5 in which the concentration of chloride ion is between 0.1 and 2 molar.

7. The process of claim 6 in which the chloride ion is in the form of dissolved KCl and the concentration of chloride ion is between 0.2 and 1.2 molar.

8. The process of claim 1 in which the electrolytic solution comprises cobalt ions.

9. The process of claim 1 in which the electrochemical process is the electrolysis of water.

10. The process of claim 1 in which the conductivity of the aqueous electrochemical solution is greater than 100 mho-cm.

11. The process of claim 10 in which the electrochemical solution has pH greater than 7.

12. The process of claim 11 in which the electrochemical solution comprises potassium hydroxide with concentration of approximately 30 weight percent.

13. The process of claim 1 in which the anode structure comprises, in addition to nickel, cobalt.

14. The process of claim 1 in which the anode structure consists essentially of nickel.

15. An electrochemical process comprising the step of passing current through anode, aqueous electrochemical solution and cathode in which water is reduced at the cathode to form hydrogen, the cathode is made from a cathode structure by an electrolytic porcedure and the cathode structure comprises nickel characterized in that the electrolytic procedure comprises the step of exposing the cathode structure to alternate anodic and cathodic potentials in an electrolytic solution, said electrolytic solution having conductivity greater than 0.001 mho-cm and said electrolytic solution comprising ions that enhance the dissolution of metallic nickel.

16. The process of claim 15 in which the anode is made in accordance with the electrolytic procedure of claim 1.

17. The process of claim 16 in which the electrochemical process is the electrolysis of water.

* * * * *